Figure 1:
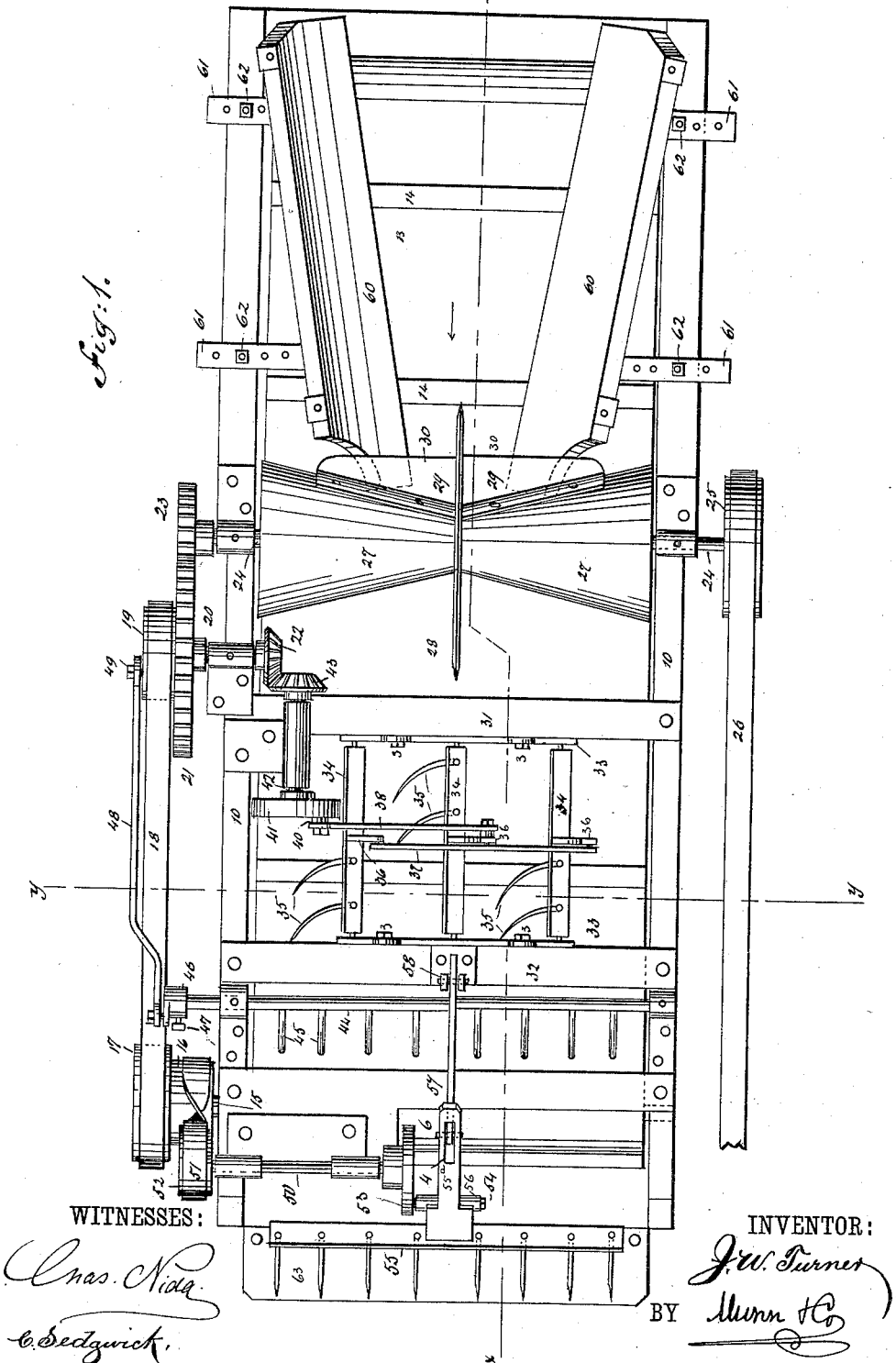

(No Model.) 2 Sheets—Sheet 1.

J. W. TURNER.
BAND CUTTER AND FEEDER FOR THRASHING MACHINES.

No. 396,843. Patented Jan. 29, 1889.

WITNESSES:
Chas. Nida
C. Sedgwick.

INVENTOR:
J. W. Turner
BY Munn & Co
ATTORNEYS.

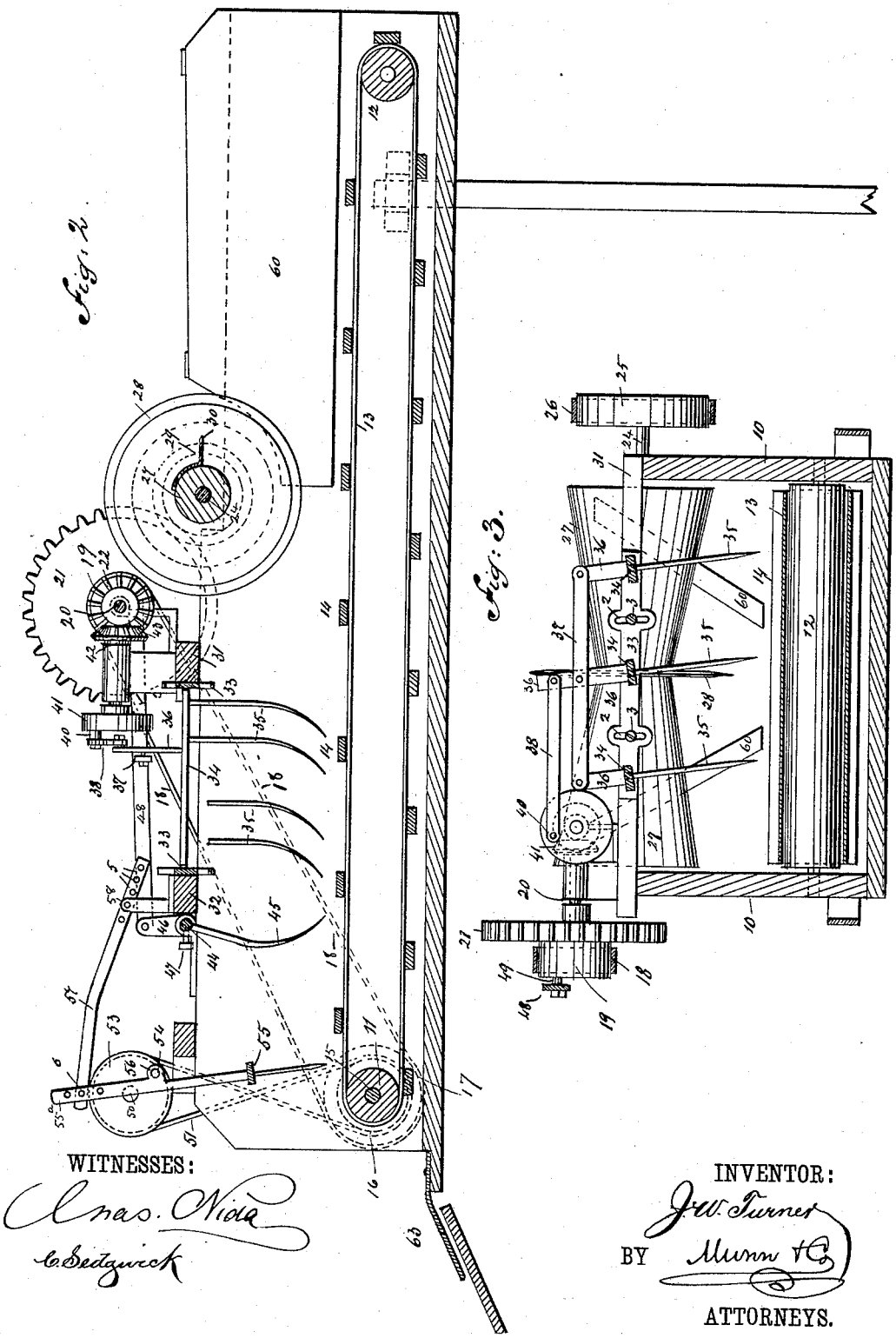

UNITED STATES PATENT OFFICE.

JACOB W. TURNER, OF VAN WERT, OHIO.

BAND-CUTTER AND FEEDER FOR THRASHING-MACHINES.

SPECIFICATION forming part of Letters Patent No. 396,843, dated January 29, 1889.

Application filed May 10, 1887. Renewed December 27, 1888. Serial No. 294,772. (No model.)

*To all whom it may concern:*

Be it known that I, JACOB W. TURNER, of Van Wert, in the county of Van Wert and State of Ohio, have invented a new and Improved Band-Cutter and Feeder for Thrashing-Machines, of which the following is a full, clear, and exact description.

This invention relates to band-cutters and feeders for thrashing-machines, the objects of the invention being to improve the construction of the band-cutters and feeders for which Letters Patent No. 319,940, of June 9, 1885, were issued to J. W. Turner and E. W. Strack, and Letters Patent No. 347,280 were issued August 10, 1886, to J. W. Turner, by providing for a more thorough separation of the straw prior to its delivery to the thrashing-machine and by providing for a better regulation of the feed of such grain, which objects I accomplish by the improved construction illustrated in the drawings and to be hereinafter described, and specifically pointed out in the claims.

Reference is to be had to the accompanying drawings, forming a part of this specification, in which similar figures of reference indicate corresponding parts in all the views.

Figure 1 is a plan view of my improved band-cutter and feeder for thrashing-machines. Fig. 2 is a longitudinal sectional view taken on line $x$ $x$ of Fig. 1, and Fig. 3 is a cross-sectional view taken on line $y$ $y$ of Fig. 1.

In the drawings, 10 represents the main frame of the machine, which consists of two properly-connected side boards, between which there is arranged a bottom board, as best shown in Figs. 2 and 3. Just above this bottom board there are mounted two transverse drums, 11 and 12, which carry an endless belt, 13, the outer face of which is provided with cleats 14.

Upon the shaft 15 of the drum 11 there are mounted two pulleys, 16 and 17, the pulley 17 being the driving-pulley of the shaft 15, and in connection with this pulley I arrange a belt, 18, which runs to a pulley, 19, that is carried by a short shaft, 20, said shaft being mounted in proper bearings above one of the side boards of the machine. The shaft 20 carries a large gear, 21, and a bevel-gear, 22, the gear 21 being arranged to mesh with a smaller gear, 23, that is carried by a shaft, 24, which is mounted to the rear of the short shaft 20 and extends entirely across the machine, a pulley, 25, which is the main driving-pulley of the band-cutter and feeder, being mounted at the opposite end of the shaft, the pulley 25 being driven by a belt, 26, which runs to the main driving-pulley of the thrashing-machine or the driving-pulley of a properly-arranged counter-shaft.

Upon the shaft 24, I mount two conical rollers, 27, each roller being in the form of the frustum of a cone, the smaller ends of the two rollers abutting against a circular cutter, 28, that is rigidly secured upon the shaft. Upon each side of the cutter 28, I arrange blades 29, that are secured to the rollers 27, the edges 30 of the blades being in a line substantially parallel with that of the axis of the shaft 24.

In advance of the shaft 24 there are mounted cross-timbers 31 and 32, to which there are adjustably connected bars 33, which serve as the bearings for longitudinal rocking bars 34, said rocking bars carrying downwardly and forwardly curved spreading prongs 35 and upwardly-extending arms 36, the arms 36 being connected by a cross-bar, 37, that is loosely secured to each of the arms. The central arm, 36, is longer than the two outer arms, and this central arm is connected by a rod, 38, with a crank-pin, 40, carried by a disk, 41, said disk being rigidly mounted upon a short longitudinal shaft, 42, which carries a bevel-gear, 43, that is engaged by the bevel-gear 22 of the shaft 20. The bars 33 are each formed with vertical slots 2, through which there are passed set-screws 3, said set-screws serving to connect the bars 33 to the cross-bars 31 and 32, by which means the curved prongs are adjusted toward or from the belt.

In advance of the prong-carrying bars 34, I mount a transverse rock-shaft, 44, which carries downwardly and rearwardly curved feed-regulating prongs 45, and to one end of this shaft 44, I connect a crank-arm, 46, said crank-arm being held to its shaft by a set-screw, 47, the arrangement being such that by turning off the set-screw 47 the shaft may be turned upon its bearings and the prongs adjusted to such position as may be required, after which, if the set-screw is again turned home, the parts will be locked in the desired position.

A connecting-rod, 48, leads from the crank-arm 46 to a wrist-pin, 49, that is carried by the pulley 19, the arrangement being such that as the shaft 20, which carries the pulley 19, is revolved a rocking motion will be imparted to the shaft 44, the connection between the rod 48 and the crank-arm 46 being farther from the axis of the shaft 44 than is the connection between said rod and the pin 49 from the axis of the shaft 20.

In advance of the shaft 44, I mount a short shaft, 50, which is driven by a belt, 51, said belt running in engagement with the pulley 16 and with a pulley, 52, that is carried by the shaft 50. This shaft 50 carries a disk, 53, and the disk in turn carries a wrist-pin, 54, upon which there is mounted a rake, 55, the rake-shank being provided with a sleeve, 56, which fits over the wrist-pin 54, the shank, however, extending upward beyond the sleeve 56. This upwardly-extending portion of the shank of the rake 55ª is vertically slotted, as shown at 4 in Fig. 1, and in the slot so formed there is mounted a rod, 57, which leads back to a bracket, 58, that is carried by the cross-bar 32, the end of the rod 57 being formed with a number of apertures, 5, so that the relative angle of the rake-shank 55ª may be adjusted as required; and in order that the pitch or throw of the rake may be regulated I provide for the adjustment of the forward end of the rod 57 within the slot 4, a number of apertures being formed in the shank, through any registering pair of which a connecting-pin, 6, may be passed.

To the rear of the rollers 27, I mount guiding plates or tables 60, which are adjustably connected to the side walls of the machine by means of connecting-irons 61 and bolts 62, said irons being each formed with a number of apertures, through which the bolts may be passed in order to give a proper adjustment to the plates or tables. To the extreme forward end of the machine I secure an apron or shield, 63, which, when the machine is in operation, should be placed so that it will overlap the receiving-table of the thrashing-machine, as indicated in Fig. 2.

In operation the sheaves are placed upon the endless belt 13 between the tables 60, and a proper motion is imparted to the shaft 24 to drive the belt in the direction of the arrow shown in connection therewith in Fig. 1. Then, as the sheaves are carried beneath the rollers 27, the knife 28 will cut the bands, and the blades 29 will act to prevent the packing of the straw beneath the rollers 27. After the bands have been cut the grain is carried forward and into the paths of the prongs 35, which prongs vibrate in a direction transverse to that of the travel of the upper face of the belt 13, and these prongs 35, it will be remembered, may be adjusted toward or from the upper face of the belt.

The feed of the machine is regulated by adjusting the rock-shaft 44 so as to carry its prongs to a position so that their entrance into the straw will be varied, a slow feed being brought about by causing the prongs to enter more deeply into the straw, while a rapid feed is secured by causing the prongs to only slightly enter the straw. After the straw has passed the prongs 45 it is caught by the rake 55, which, owing to its peculiar connection with the disk 53 and the bar or rod 57, is caused to travel in an elliptical course, a pitching motion, as it were, being imparted to the rake.

Having thus fully described my invention, I claim as new and desire to secure by Letters Patent—

1. In a band-cutter and feeder, the combination of a cutter, conical rollers having their ends abutting against said cutter, and blades secured to said rollers, substantially as described.

2. In a band-cutter and feeder, the combination of a cutter, conical rollers having their smaller ends abutting against the said cutter, and blades secured to the rollers and having their outer edges parallel with the axis of the said rollers, substantially as herein shown and described.

3. In a band-cutter and feeder, the combination, with the cutter-shaft 24, of the longitudinal rocking bars 34, provided with the curved spreading prongs 35 and the upwardly-extending arms 36, one of the said arms being longer than the others, the cross-bar 37, loosely connected to the arms 36, the disk 41, provided with crank-pin 40, the rod 38, connected to the crank-pin and to the long arm 36, the shaft 42, carrying the said disk and provided at its other end with the bevel gear-wheel 43, and means for operating the shaft 20 from the cutter-shaft, substantially as herein shown and described.

4. In a band-cutter and feeder, the combination, with an endless carrying-belt, of spreading prongs vibrating transversely to the direction of travel of the said belt, and feed-regulating prongs vibrating in the direction of travel of the carrying-belt, substantially as herein shown and described.

5. In a band-cutter and feeder, the combination, with an endless carrying-belt, of spreading prongs vibrating transversely to the direction of travel of the said belt, feed-regulating prongs vibrating in the direction of travel of the carrying-belt, and a vibrating rake in front of the feed-regulating prongs, substantially as herein shown and described.

JACOB W. TURNER.

Witnesses:
 WM. SPRINGER,
 WILEY M. KEAR.